UNITED STATES PATENT OFFICE.

HUGH R. STEWART, OF MERCER, PENNSYLVANIA.

IMPROVEMENT IN PROCESSES OF FORMING BLACKBOARDS OR SLATES.

Specification forming part of Letters Patent No. 169,861, dated November 9, 1875; application filed October 13, 1875.

*To all whom it may concern:*

Be it known that I, HUGH R. STEWART, of Mercer, in the county of Mercer and in the State of Pennsylvania, have invented certain new and useful Improvements in Compounds for Forming Blackboards and Slates; and do hereby declare that the following is a full, clear, and exact description thereof.

The nature of my invention consists in a combination blackboard and slate, as will be hereinafter more fully set forth.

In this blackboard and slate surfacing I use a base of Manila paper pasted on a plastered wall, said base being made of any size and form desired. This base is then covered with two coats of different compositions—A and B—which completes the slate-surface.

The composition A is made of one gallon alcohol; one-half pound gum-shellac; one-half pound drop-black; one-half pound extract logwood; one-eighth pound blue vitriol; one-half pound flour emery; one-half pound pumice; one-fourth pound umber.

When the various ingredients are fully dissolved in the alcohol this composition is ready for use.

The composition B is composed of one gallon alcohol; one-half pound gum-shellac; one-half pound drop-black; one-half pound extract logwood; one-eighth pound blue vitriol; one-fourth pound pumice; one-fourth pound umber.

After the Manila-paper base is thoroughly dry a coat is put on of the composition A, and when this coat is thoroughly dried a second coat is put on of the composition B. As soon as this coat is dried the blackboard or slate-surface is finished.

I do not confine myself to the exact proportions of the ingredients in the two compositions, as they may be varied according to the quality of the work desired.

Having thus fully described my invention, what I claim as new, and desire to secure by Letters Patent, is—

The within-described process for forming a blackboard or slate, consisting of first coating a Manila-paper base with alcohol, shellac, drop-black, extract logwood, blue vitriol, emery, pumice, and umber, and then recoating the same after being dried with the same composition excepting the emery, all substantially as set forth.

In testimony that I claim the foregoing I have hereunto set my hand this 28th day of September, 1875.

HUGH R. STEWART.

Witnesses:
WM. A. SKINKLE,
WM. PARSHALL.